(12) United States Patent
Kim et al.

(10) Patent No.: US 9,332,482 B2
(45) Date of Patent: May 3, 2016

(54) METHOD FOR COMMUNICATION OF BASE STATION, TERMINAL AND RELAY STATION

(75) Inventors: Eunkyung Kim, Daejeon (KR); Sung Kyung Kim, Daejeon (KR); Sung Cheol Chang, Daejeon (KR); Hyun Lee, Daejeon (KR); Chul Sik Yoon, Seoul (KR); Kwang Jae Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 230 days.

(21) Appl. No.: 13/462,366

(22) Filed: May 2, 2012

(65) Prior Publication Data

US 2012/0281615 A1 Nov. 8, 2012

(30) Foreign Application Priority Data

| May 3, 2011 | (KR) | 10-2011-0042047 |
|---|---|---|
| May 3, 2011 | (KR) | 10-2011-0042048 |
| Jul. 11, 2011 | (KR) | 10-2011-0068542 |
| Apr. 30, 2012 | (KR) | 10-2012-0045400 |
| Apr. 30, 2012 | (KR) | 10-2012-0045401 |

(51) Int. Cl.
 H04B 7/14 (2006.01)
 H04W 40/34 (2009.01)
 H04W 76/04 (2009.01)

(52) U.S. Cl.
 CPC ............ *H04W 40/34* (2013.01); *H04W 76/041* (2013.01)

(58) Field of Classification Search
 CPC .......................... H04W 40/34; H04W 76/041
 USPC ......................................................... 370/315
 See application file for complete search history.

(56) References Cited

U.S. PATENT DOCUMENTS

| 8,625,582 | B2 * | 1/2014 | Hegde ................... H04W 40/02 370/237 |
|---|---|---|---|
| 2003/0100314 | A1 * | 5/2003 | Czaja et al. .................... 455/456 |
| 2004/0147223 | A1 * | 7/2004 | Cho .............................. 455/41.2 |
| 2005/0281269 | A1 * | 12/2005 | Choi ......................... 370/395.2 |
| 2006/0111111 | A1 * | 5/2006 | Ovadia .......................... 455/439 |
| 2007/0058622 | A1 * | 3/2007 | Lee ............................... 370/389 |
| 2008/0181113 | A1 * | 7/2008 | Narayanan et al. ........... 370/235 |
| 2009/0168722 | A1 * | 7/2009 | Saifullah et al. .............. 370/331 |
| 2009/0213730 | A1 * | 8/2009 | Zeng et al. .................... 370/217 |
| 2010/0061328 | A1 * | 3/2010 | Walldeen et al. ............. 370/329 |
| 2010/0157826 | A1 | 6/2010 | Yu et al. |
| 2010/0157900 | A1 * | 6/2010 | Moon et al. ................... 370/328 |
| 2011/0053599 | A1 * | 3/2011 | Hsu et al. ...................... 455/436 |
| 2012/0002537 | A1 * | 1/2012 | Bao et al. ...................... 370/221 |
| 2012/0064854 | A1 | 3/2012 | Youn et al. |
| 2013/0077614 | A1 * | 3/2013 | Ni ................................. 370/338 |

FOREIGN PATENT DOCUMENTS

| KR | 10-2010-0110265 A | 10/2010 |
|---|---|---|
| WO | WO 2011147082 A1 * | 12/2011 |

OTHER PUBLICATIONS

Machine Translation of WO 2011/147082 A1.*

* cited by examiner

*Primary Examiner* — Huy D Vu
*Assistant Examiner* — Kevin Cunningham
(74) *Attorney, Agent, or Firm* — Rabin & Berdo, P.C.

(57) ABSTRACT

A method for communication of a base station includes: receiving first data from a first terminal; transmitting the first data to a second terminal by local forwarding without passing through an access service network (ASN); receiving second data from the second terminal; and transmitting the second data to the first terminal without passing through the ASN.

5 Claims, 14 Drawing Sheets

METHOD FOR COMMUNICATION OF BASE STATION, TERMINAL AND RELAY STATION

CROSS-REFERENCE TO RELATED APPLICATION

This application claims priority to and the benefit of Korean Patent Application Nos. 10-2011-0042047, 10-2011-0042048, 10-2011-0068542, 10-2012-0045400 and 10-2012-0045401 filed in the Korean Intellectual Property Office on May 3, 2011, May 3, 2011, Jul. 11, 2011, Apr. 30, 2012 and Apr. 30, 2012, the entire contents of which are incorporated herein by reference.

BACKGROUND OF THE INVENTION (a) Field of the Invention

The present invention relates to a method for communication of a base station, a terminal, and a relay station.

(b) Description of the Related Art

In the event of a disaster or calamity, important social infrastructure may be destroyed or damaged. Some of the important social infrastructure includes a variety of communication facilities such as wireless phones, wired phones, internet networks, etc. Destruction or damage of such communication facilities would increase social chaos following a disaster and make it difficult to have a society's ability to recover from the disaster. Therefore, it is crucial to provide high-reliability support for means to quickly recover or replace the communication facilities. For high-reliability support, a mobile communication system (HR-Network) should satisfy the following requirements.

First, it should have backward compatibility with an existing system, i.e., WirelessMAN-OFDMA or WirelessMAN-Advanced Interface. Next, it should be capable of multimode operation which enables an HR-base station 100, an HR-mobile station HR-MS, and an HR-relay station HR-RS to play the roles of other stations as well as their own roles.

Moreover, communication should be sustained even if a base station, a relay station, or a wireless link is disabled, that is, in the event of a single point of failure (SPOF). Also, it is necessary that direct communication is possible between different terminals. Multicast transmission, i.e., enhanced multicast communication, needs to be provided within a network, and path management needs to be provided to manage routing and forwarding for data transmission and reception.

Particularly, when a terminal wants to transmit data to another terminal within a base station or relay station through the base station or relay station, delay may be generated because routing and services should be done at the base station or relay station through an upper layer network.

Moreover, it is necessary to provide continuing support to communication between terminals in case of non-smooth communication due to collapse of a backbone network of the base station.

SUMMARY OF THE INVENTION

The present invention has been made in an effort to set up an optimum route to prevent service delay when establishing a path between a terminal and an upper layer network. The present invention has been made in another effort to provide a method for supporting communication terminals within a base station to properly perform communication tasks when a backbone network is damaged and disconnected from an upper layer network in a communication system.

An exemplary embodiment of the present invention provides a method for communication of a base station, the method including: receiving first data from a first terminal; transmitting the first data to a second terminal by local forwarding without passing through an access service network (ASN); receiving second data from the second terminal; and transmitting the second data to the first terminal without passing through the ASN.

The method may further include mapping an uplink CID, uplink STID, or uplink FID received from the first terminal to a downlink CID, downlink STID, or downlink FID, respectively, and passing the first data to the second terminal.

The method may further include: receiving, from the first terminal, a first request message for communication with the second terminal; and transmitting, to the first terminal, a second response message for the first request message.

The method may further include: transmitting a second request message for approval to the ASN according to the first request message; and receiving a first response message for the second request message from the ASN, wherein the first response message may contain information indicating that local forwarding is available.

The second response message may contain information about the allocation of a flow identifier (FID) or connection identifier (CID) or information about a point of time of completion of local forwarding.

If a path has already been established between the first terminal and the second terminal, the second response message may contain information about the re-use of an existing FID or CID.

The method may further include: receiving a third request message for termination of communication from the first terminal; and transmitting a fourth request message notifying of termination of communication to the ASN after receiving the third request message.

Another exemplary embodiment of the present invention provides a method for communication of a terminal, the method including the steps in which: a first terminal transmits, to a base station, a first request message for communication with a second terminal using local forwarding; and the first terminal receives a response message from the base station after the base station receives approval for local forwarding from an access service network (ASN).

The response message may contain information about the allocation of a flow identifier (FID) or connection identifier (CID).

The response message may contain information about a point of time of termination of local forwarding, and the method may further include the step in which the first terminal transmits, to the base station, a second request message for termination of local forwarding.

Another exemplary embodiment of the present invention provides a method for communication of a terminal, the method including the steps in which: when a backbone network between a base station and an upper layer network is damaged, a first terminal transmits, to the base station, a first request message for communication with a second terminal; the first terminal receives a first response message from the base station; and the first terminal communicate with the second terminal through the base station.

The first response message may contain information about the allocation of a service flow.

The method may further include the step in which, if there is at least one second terminal, the first terminal sets up a service flow of the at least one second terminal.

The method may further include: receiving a second request message for restoration of the backbone network from the base station; and transmitting a second response message from the base station.

Yet another exemplary embodiment of the present invention provides a method for communication of a base station, the method including the steps in which: when a backbone network between the base station and an upper layer network is damaged, the base station receives, from a first terminal, a first request message for communication with a second terminal; and the base station transmits a first response message to the first terminal.

The method may further include the steps in which: the base station transmits, to the second terminal, a second request message for communication setup with the first terminal; and the base station receives a second response message from the second terminal.

The first response message may involve the approval or rejection of the first request message, and if the first response message involves approval, the first response message may contain information about the allocation of a service flow.

The method may further include transmitting, to the first terminal, a command message containing information required for flow creation.

The method may further include: if the backbone network is restored, transmitting a third request message indicative of the restoration to the first terminal; and receiving a third response message from the first terminal.

The method may further include: transmitting a fourth request message indicative of the restoration to the second terminal; and receiving a fourth response message from the second terminal.

DETAILED DESCRIPTION OF THE EMBODIMENTS

Figure 1:
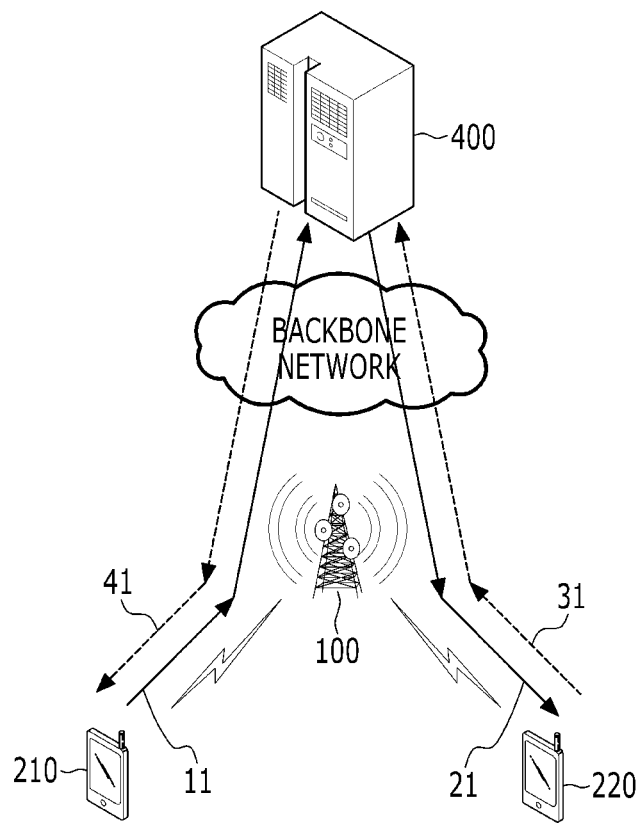
FIG. 1 is a view illustrating a data flow in a typical communication system.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In this specification, a mobile station (MS) may designate a terminal, a mobile terminal (MT), a subscriber station (SS), a portable subscriber station (PSS), an access terminal (AT), user equipment (UE), an advanced mobile station (AMS), a high reliability mobile station (HR-MS), etc., and may include the entire or partial functions of the terminal, the MT, the SS, the PSS, the AT, the UE, the AMS, the HR-MS, etc.

In this specification, a base station (BS) may designate a nodeB, an evolved nodeB (eNodeB), an access point (AP), a radio access station (RAS), a Node B, a base transceiver station (BTS), a mobile multihop relay (MMR-BS), an advanced base station (ABS), a high reliability base station (HR-BS), an advanced relay station (ARS), a high reliability relay station (HR-RS), etc., and may include the entire or partial functions of the nodeB, the eNodeB, the AP, the RAS, the BTS, the MMR-BS, the ABS, the HR-BS, the RS, the ARS, the HR-RS, etc.

Now, a method for setting up an optimum route to prevent service delay when establishing a path between a terminal and an upper layer network through a base station or relay station will be described in detail.

FIG. 1 is a view illustrating a data flow in a typical communication system.

Referring to FIG. 1, the typical communication system includes a base station 100, terminals 210 and 220 transmitting and receiving data to and from the base station 100, and an access service network (ASN) 400 managing the base station 100. The base station 100 and the access service network 400 are interconnected by a backbone network.

The terminal 210 transmits data to the access service network 400 through a path 11, and the access service network 400 transmits data from the terminal 210 to the terminal 220 through a path 21. Also, the terminal 220 transmits data to the access service network 400 through a path 31, and the access service network 400 transmits data from the terminal 220 to the terminal 210 through a path 41. When the paths 11, 21, 31, and 41 are set up between the terminals 210 and 220 and the access service network 400 through the base station 110, and services are provided through the paths 11, 21, 31, and 41, delay may be generated during data transmission.

Figure 2:
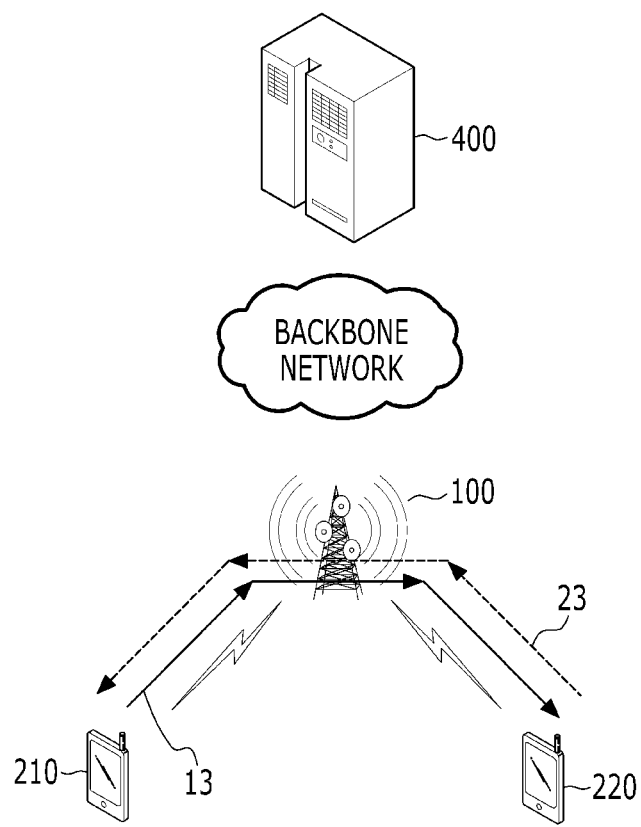
FIG. 2 is a view illustrating communication of terminals through a base station in a communication system according to an exemplary embodiment of the present invention.

FIG. 2 is a view illustrating communication of terminals through a base station in a communication system according to an exemplary embodiment of the present invention.

As shown in FIG. 1, when the terminal 210 and the terminal 220 are connected to the base station 100, data transmission and reception between the terminal 210 and the terminal 220 do not need to involve transmitting data from the base station 100 to an upper layer network entity, i.e., the access service network 400, and transmitting it again to the base station 100.

As depicted in FIG. 2, communication between the terminal 210 and the terminal 220 is performed through the paths 13 and 23, i.e., only through the base station 100, which will be hereinafter referred to as local forwarding. Now, this will be described in detail with reference to FIG. 3.

Figure 3:
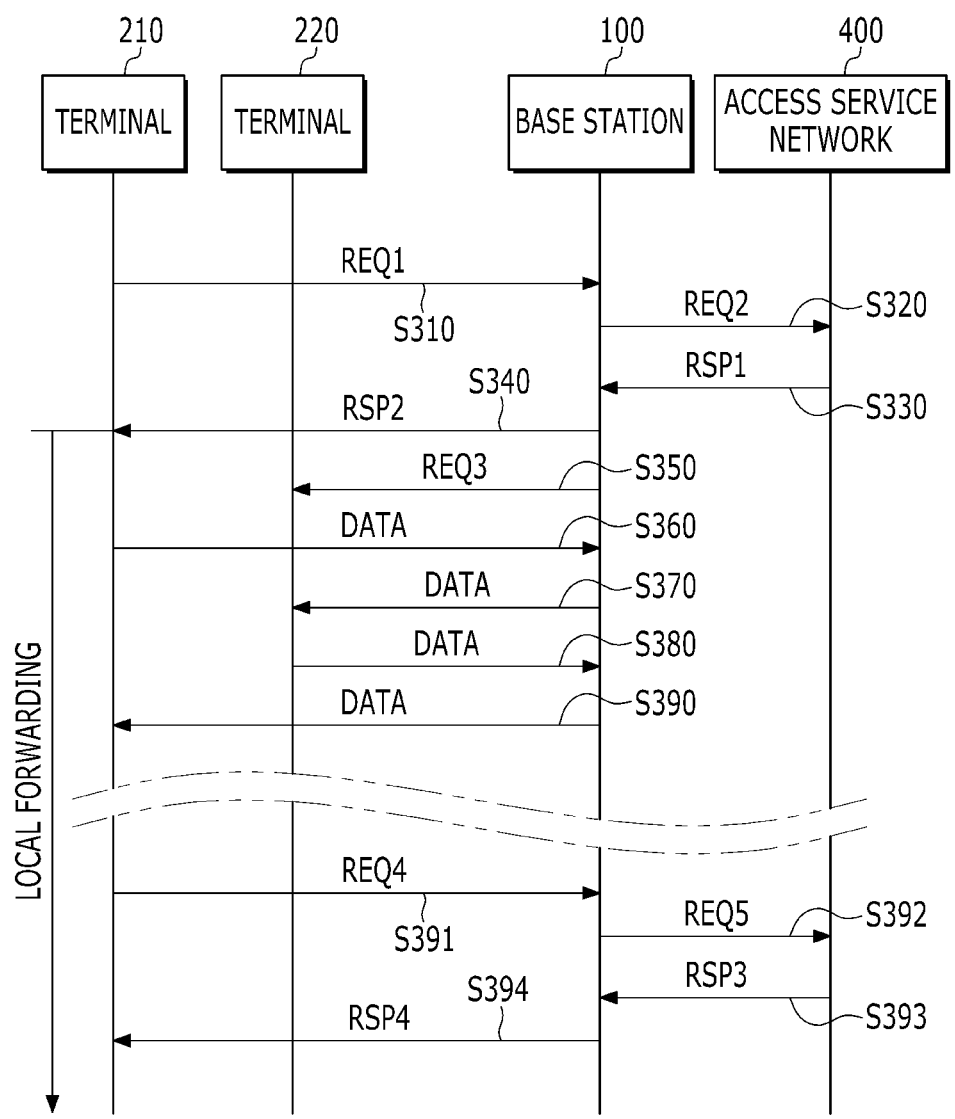
FIG. 3 is a flowchart for explaining a method for communication of a terminal through a base station in a communication system according to an exemplary embodiment of the present invention.

FIG. 3 is a flowchart for explaining a method for communication of a terminal through a base station in a communication system according to an exemplary embodiment of the present invention.

Referring to FIG. 3, the terminal 210 transmits, to the base station 100, a request message REQ1 for communication with the terminal 220 (S310). Then, the base station 100 transmits, to the access service network 400, a request message REQ2 for approval of communication between the terminal 210 and the terminal 220 (S320).

Then, the access service network 400 transmits a response message RSP1 to the base station 100 in response to the request message REQ2 (S330). The response message RSP1 may contain information that the terminal 220 wanting to communicate with the terminal 210 is in the same service zone with the terminal 210, that is, local forwarding is possible.

A router for performing a routing function to determine whether to perform local forwarding may exist in the access service network 400, independently from the base station 100. Data transmission between the base station 100 and the router may be performed through a backhaul link. If the router exists within the base station 100, data transmission may be performed over an internal interface.

Subsequently, the base station 100 transmits a response message RSP2 for the request message REQ1 to the terminal 210 intending to initiate communication. At this point, the base station 100 allocates a specific flow identifier (FID) or connection identifier (CID) (hereinafter, the connection ID will be referred to as the flow ID) so as to easily identify data transmitted from the terminal 210 to the terminal 220. Moreover, the base station 100 transmits a request message REQ3 to the terminal 220 (S340), and allocates a specific flow identifier (FID) for the terminal 210 or the same flow identifier (FID) allocated to the terminal 210 to the terminal 220 so as to perform communication between the terminal 210 and the terminal 220.

Thereafter, the terminal 210 transmits data DATA1 targeted for the terminal 220 to the base station 100 (S350), and the base station 100 transmits the data DATA1 received from the terminal 210 to the terminal 220 (S360). Also, the terminal 220 transmits data DATA2 targeted for the terminal 210 to the base station 100 (S370), and the base station 100 transmits the data DATA2 received from the terminal 220 to the terminal 210 (S380).

At this point, the base station 100 may include the time of completion of local forwarding, which takes the form of a timer, in the response message RSP2 or request message REQ3, and transmit it to the terminal 210 or terminal 220. The terminal 210 or the terminal 220 may be notified of completion at the expiry of the timer.

Even before the expiry of the timer, the terminal 210 may transmit a request message REQ4 to the base station 100 to request termination of communication (S390). Subsequently, the base station 100 transmits, to the access service network 400, a request message REQ5 notifying of termination of communication (S391).

Then, the access service network 400 transmits a response message RSP3 for the request message REQ5 to the base station 100 (S392), and the base station 100 transmits a response message RSP4 for the request message REQ4 to the terminal 210 (S393).

Although the steps S390, S391, S392, and S393 have been described with respect to a termination process performed by the terminal 210, the terminal 220 may request termination of communication, and communication may be terminated by the base station 100.

Meanwhile, the terminal 210 may regard a point of time of reception of the response message RSP2 as the start time of local forwarding and transmit data to be serviced by local forwarding to the base station 100, or the terminal 210 may set up the start time of local forwarding by taking the completion of response to the response message REQ3 into consideration.

The base station 100 may regard a point of time of completion of the transmission of the response message REQ3 as the start time of local forwarding and start local forwarding. In this case, the terminal 210 or the terminal 220 performs transmission or reception only for a connection setup allocated for local forwarding, and after completion of local forwarding, may transmit and receive data for a connection setup allocated for other purposes than local forwarding.

Now, a transmission method according to another exemplary embodiment will be described in detail with reference to FIG. 4.

Figure 4:
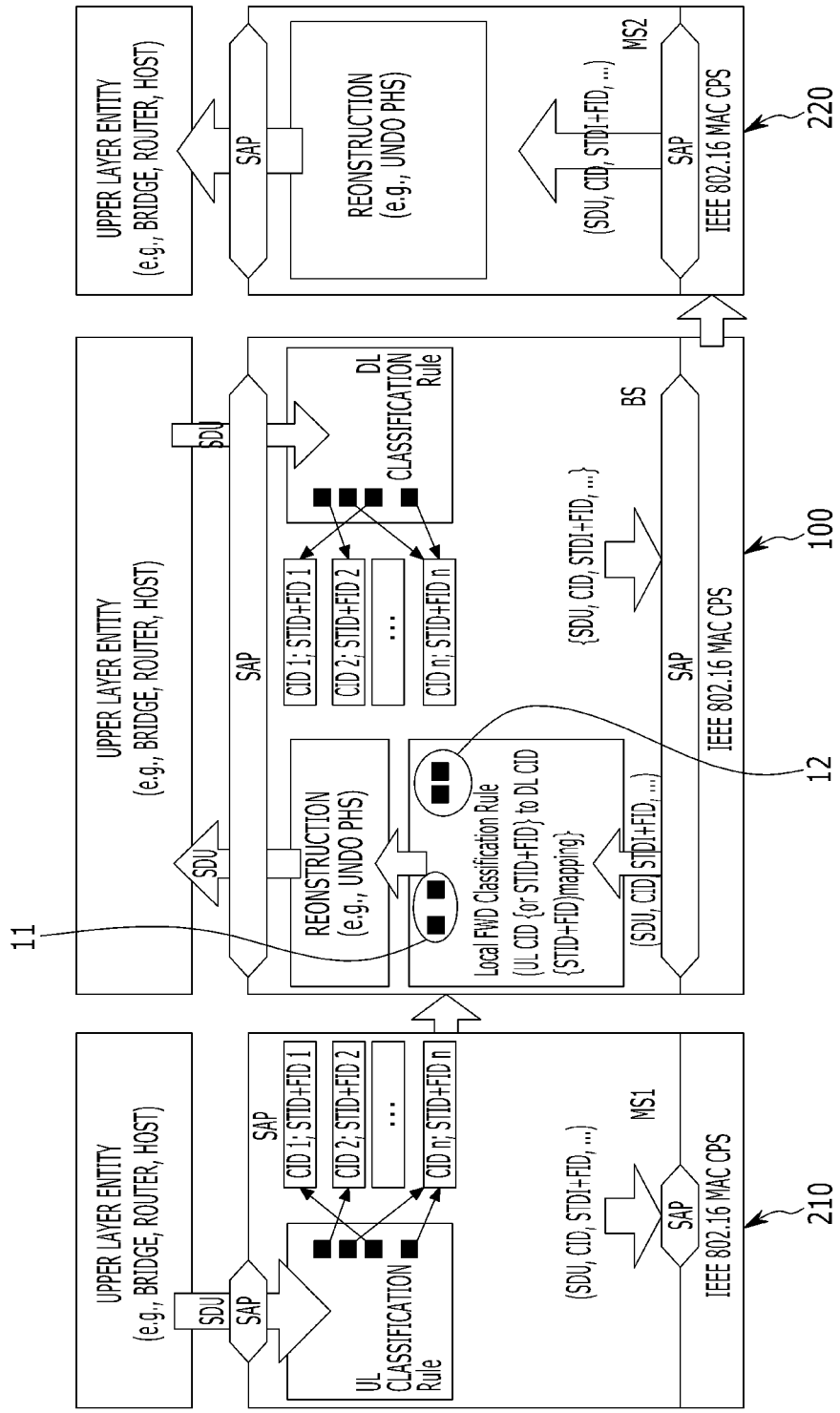
FIG. 4 is a view illustrating a service data unit for which local forwarding is performed in a communication system according to an exemplary embodiment of the present invention.

FIG. 4 is a view illustrating a service data unit for which local forwarding is performed in a communication system according to an exemplary embodiment of the present invention.

The base station 100 may perform a service connection through a typical service connection setup procedure and connect data between the terminals 210 and 220, instead of allocating a specific FID to the terminals 210 and 220. That is, the base station 100 does not transmit between the terminals 210 and 220 through the access service network 400, but instead decodes an MAC header, recognizes transmission and reception of data between the terminal 210 and the terminal 220, and then connects data between the terminal 210 and the terminal 220. With this method, there is no need to recognize the fact that the terminal 210 and the terminal 220 communicate by local forwarding.

In this case, as shown in FIG. 4, services are provided by local forwarding within the base station, or data is transmitted up to an upper layer network and transmitted to other base stations. That is, a part for performing local forwarding determines the availability of local forwarding, classifies data according to situations, and services the data. As depicted in FIG. 4, the availability of local forwarding may be determined based on a CID, STID, or FID transmitted from the terminal 210, and corresponding data may be directly mapped to a downlink CID and passed to the terminal 220, instead of being passed to an upper layer. The part for determining the availability of local forwarding may also exist in the upper layer. At this point, if there is data that cannot be delivered by local forwarding, or local forwarding is performed at the upper layer, this can be classified as indicated by 11 within the base station 100. If local forwarding is performed at the upper layer, such data as classified as indicated by 12 within the base station 100 is not required. Thus, all data is passed to the upper layer through a reconstruction part without performing local forwarding rule classification.

Meanwhile, if there are a plurality of receivers corresponding to the terminal 220, local forwarding will be useful when the terminal 210, the talker, makes a multicast connection, for example, a group call. In this case, priority is given to a plurality of terminals intending to be a talker. Alternatively, a service is initiated by the first terminal that is successful in making a resource request, terminated according to a timer, and maintained over an allocation period. Moreover, each service may be configured to be initiated and terminated in the above-stated manner. Further, the timer is capable of extending and shortening time by additional signaling Although the exemplary embodiment of the present invention has been described with respect to the base station 100, a relay station, instead of the base station 100, may perform local forwarding, and all exemplary embodiments of the present invention are applicable to the relay station (not shown).

Now, a method for supporting communication between terminals within a base station when a backbone network is damaged and disconnected from an upper layer network in a communication system will be described in detail.

Figure 5:
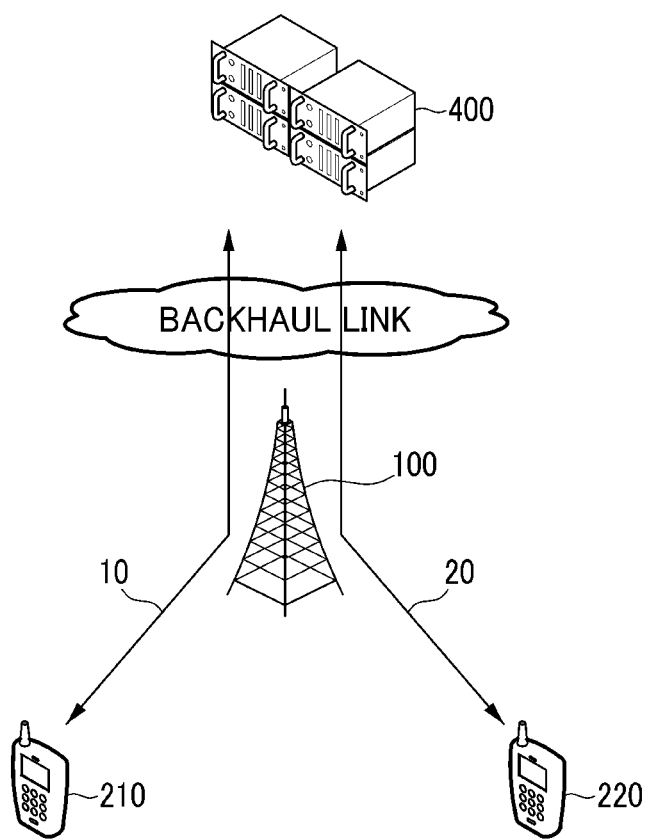
FIG. 5 is a view illustrating a typical communication situation.
Figure 6:
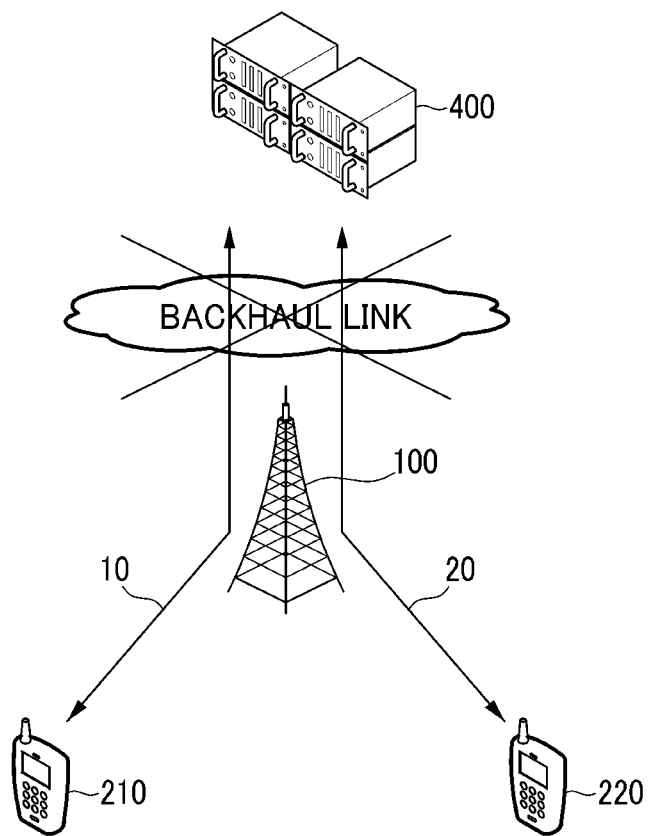
FIG. 6 is a view illustrating a communication situation in which a backbone network of a base station is damaged.

FIG. 5 is a view illustrating a typical communication situation, and FIG. 6 is a view illustrating a communication situation in which a backbone network of a base station is damaged.

Referring to FIG. 5, a typical communication system includes a base station 100, terminals 210 and 220 transmitting and receiving data to and from the base station 100, and a server 400 managing the base station 100. The base station 100 and the server 400 are interconnected by a backbone network. Paths 10 and 20 between each of the terminals 210 and 220 and an upper layer network including the server 400 are formed.

Referring to FIG. 6, when the backbone network of the base station 100 is damaged, the paths 10 and 20 between each of the terminals 210 and 220 and an upper layer network including the server 400 are collapsed. Therefore, it is difficult to perform smooth communication. At this point, the communication system needs to provide continuing support to communication between the terminal 210 and the terminal 220. Now, this will be described in detail.

Figure 7:
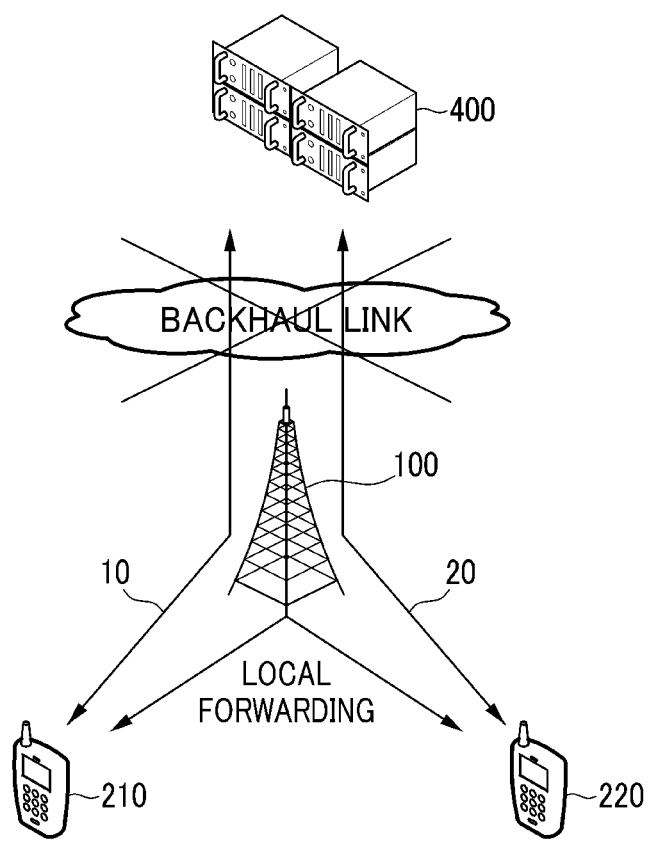
FIG. 7 is a view illustrating communication between terminals when a backbone network is damaged according to an exemplary embodiment of the present invention.

FIG. 7 is a view illustrating communication between terminals when a backbone network is damaged according to an exemplary embodiment of the present invention.

Referring to FIG. 7, even when the backbone network between the base station 100 and the server 400 of the upper layer network is damaged, the base station 100 provides continuing support to communication between the terminal 210 and the terminal 220. This type of network is called a standalone network or independent network, and services over this network are available by local forwarding.

That is, communication between the terminal 210 and the terminal 220 is established only through the base station 100 without help from a network entity, i.e., the server 400, of the upper layer network. With the standalone network configured due to the collapse of the backbone network, the base station 100 or the terminals 210 and 220 may maintain or discard the existing service flow, and the base station 100 may allocate a new service flow to the terminals 210 and 220.

If a destination terminal exists within the standalone network according to a service flow, the base station 100 may perform local forwarding to transmit corresponding data without help from the server 400. In this case, the base station 100 may maintain the existing service flow, or assign a flow containing information, such as a new flow identifier (FID), required for flow creation to the terminals 210 and 220.

Alternatively, the base station 100 may analyze the header of data received from the terminals 210 and 220 regardless of whether the service flow is maintained or a new service flow is assigned, and if the destination terminal exists within the standalone network, may create and transmit a header for a service. At this point, the creation of a service flow may be notified by using an MAC message, MAC header, or downlink control channel, or by a predefined method. In this exemplary embodiment, a management method using an MAC message will be explained. Now, a process for configuring a standalone network will be described in detail with reference to FIG. 4.

Figure 8:
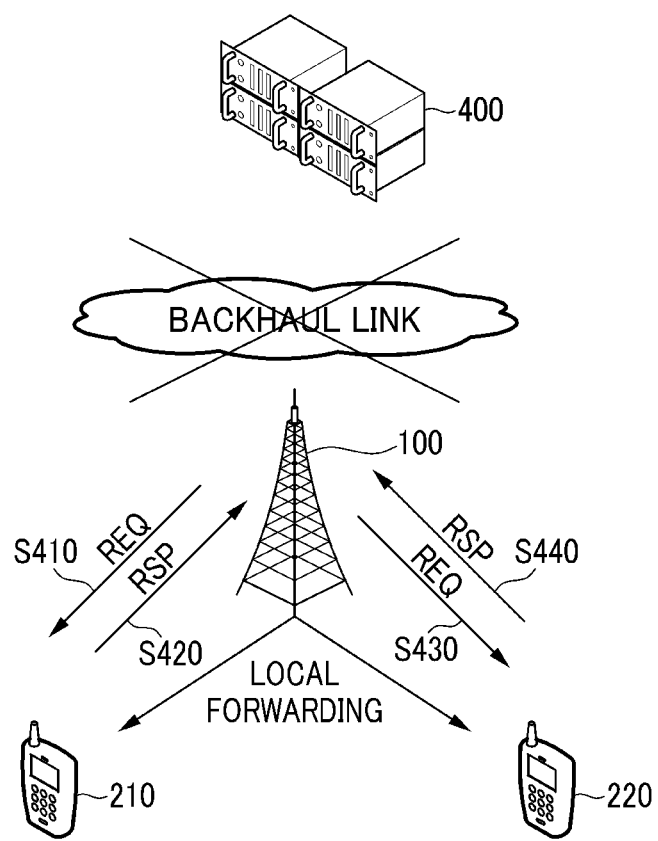
FIG. 8 is a view illustrating communication between terminals when a backbone network is damaged according to another exemplary embodiment of the present invention.

FIG. 8 is a view illustrating communication between terminals when a backbone network is damaged according to another exemplary embodiment of the present invention. A communication between the terminal 210 and the terminal 220 starts from the base station 100 in a standalone network.

Referring to FIG. 8, the base station 100 transmits a request message REQ to the terminal 210 (S410), and the terminal 210 transmits a response RSP message in response to the request message REQ (S420). Subsequently, the base station 100 transmits a request message REQ for communication establishment with the terminal 210 to the terminal 220 wanting to communicate with the terminal 210 (S430). Then, the terminal 220 transmits a response message RSP to the base station 100 in response to the request message REQ (S440).

At this point, the base station 100 may create a flow containing information, such as a new flow identifier (FID), for flow creation, or request the terminal 210 to re-use the existing flow for communication with the terminal 220. In response to this request, the terminal 210 may approve the allocation of a newly created flow or the re-use of the existing flow.

Moreover, the base station 100 includes flow information to be used for communication with the terminal 220 in a request message, and transmits it to the terminal 220. As such, the terminal 220 may recognize that a communication with the terminal 210 is established through the standalone network and transmit a response message to the base station 100. If there are two or more destination terminals, a multicast flow, instead of respective flows for the destination terminals, is created, thus reducing the load from flow creation and the standalone network. Furthermore, when the terminal 220 intends to respond to data transmitted from the terminal 210, the existing service flow may be used.

Figure 9:
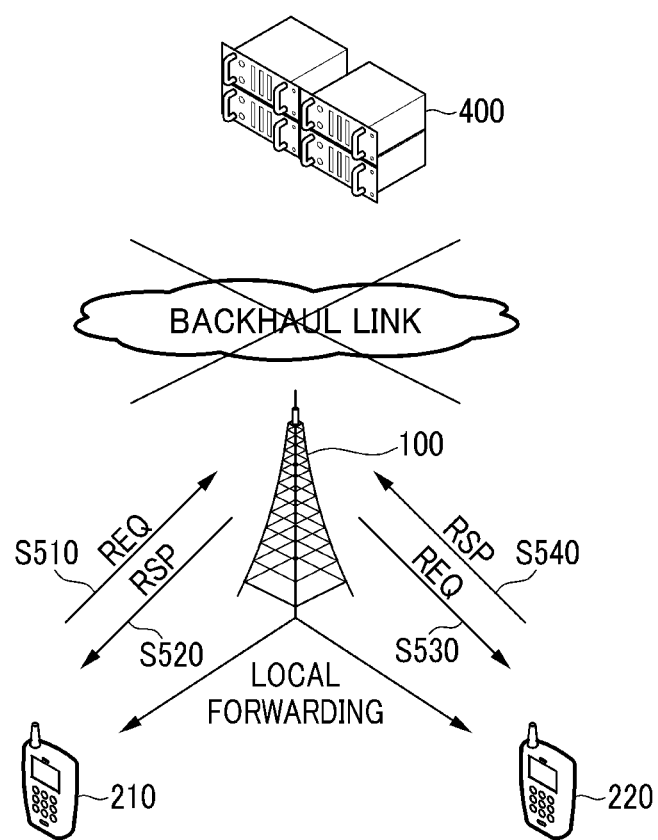
FIG. 9 is a view illustrating communication between terminals when a backbone network is damaged according to another exemplary embodiment of the present invention.

FIG. 9 is a view illustrating communication between terminals when a backbone network is damaged according to another exemplary embodiment of the present invention. A communication between the terminal 210 and the terminal 220 starts from the terminal 210 in a standalone network.

In FIG. 9, an initiation request is issued from the terminal 210 within the standalone network before service flow allocation is initiated by the base station 100. That is, the terminal 210 transmits a service initiation request message REQ to the base station 100 (S510).

Then, the base station 100 may allocate a service flow containing information, such as a flow identifier (FID), required for flow creation to the terminal 210 through a response message, and notify the terminal 210 that the service flow is valid within the standalone network (S520).

Afterwards, the base station 100 transmits a request message REQ for communication establishment with the terminal 210 to the terminal 220 wanting to communicate with the terminal 210, like in FIG. 8 (S530). Then, the terminal 220 transmits a response message RSP to the base station 100 in response to the request REQ message (S540).

If the terminal 210, a communication target requested by the terminal 220, does not exist within service coverage, the base station 100 may reject the communication establishment request.

Figure 10:
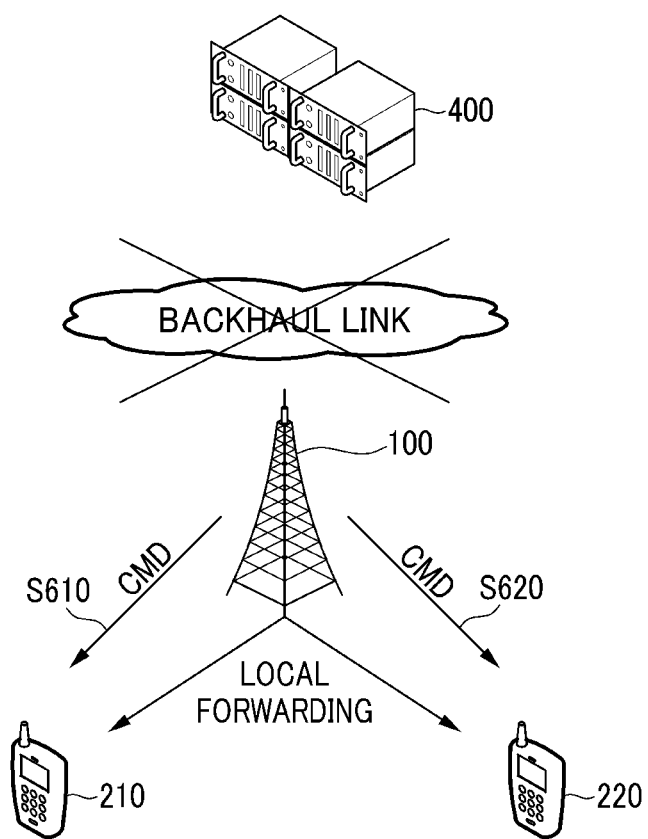
FIG. 10 is a view illustrating communication between terminals when a backbone network is damaged according to another exemplary embodiment of the present invention.

FIG. 10 is a view illustrating communication between terminals when a backbone network is damaged according to another exemplary embodiment of the present invention. A communication between the terminal 210 and the terminal 220 starts from the base station 100 in a standalone network.

Referring to FIG. 10, the base station 100 transmits, to the terminals 210 and 220, a command message CMD containing information, such as a flow identifier (FID), required for flow creation (S610 and S620). As such, the base station 100 notifies the terminals 210 and 220 of the start of communication in the standalone network, and makes them recognize that subsequent forwarding is communication within the standalone network.

Thereafter, standalone network communication is performed in the same manner as explained in FIG. 8.

Figure 11:
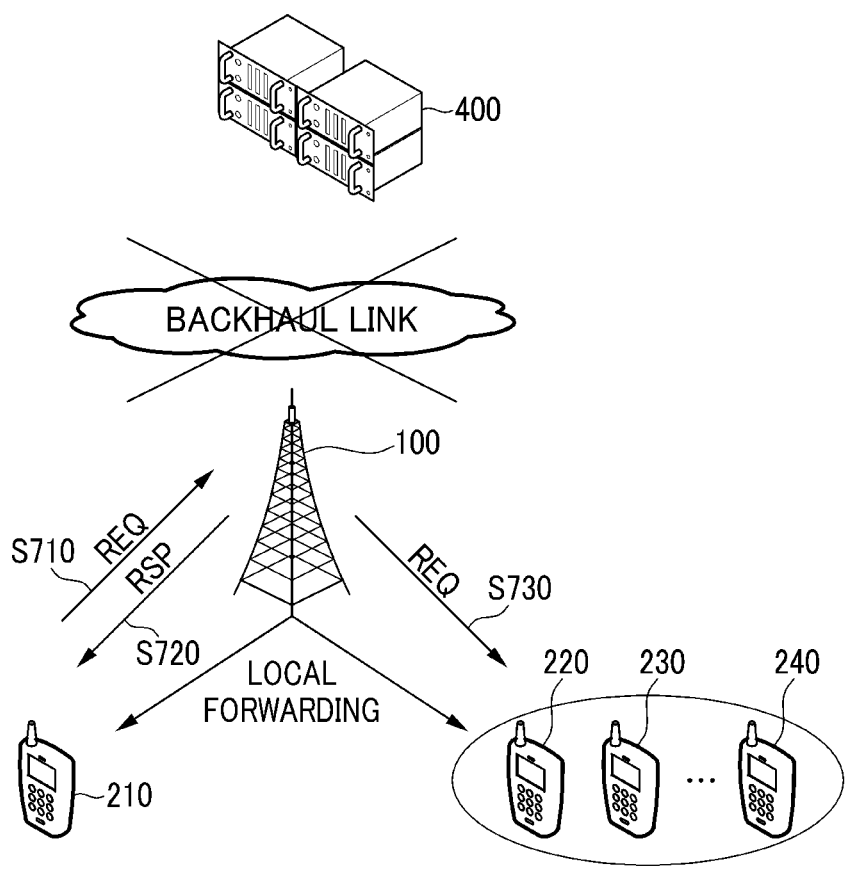
FIG. 11 is a view illustrating communication between terminals when a backbone network is damaged according to another exemplary embodiment of the present invention.

FIG. 11 is a view illustrating communication between terminals when a backbone network is damaged according to another exemplary embodiment of the present invention. The terminal 210 performs communication with a plurality of terminals 220, 230, and 240.

The case of FIG. 11 is useful when a multicast service flow is created or initiated for communication with the plurality of terminals 220, 230, and 240. That is, if the terminal 210 intends to start a service, it transmits a request message REQ to the base station (S710). In response to the request message, the base station 100 transmits, to the terminal 210, a response message RSP containing an FID for a particular uplink transmission (S720). Then, the base station 100 transmits a command message CMD to set up a service flow for the receiver terminals 220, 230, . . . , 240 (S730). In this case, information about the allocation of a specific FID to a specific group is contained in the command message to notify that the service flow is valid within the group, and the terminal 210, the talker, generates traffic based on the FID of the group. The group can be identified by a group identifier or the like.

Now, a process for terminating the standalone network will be described in detail with reference to FIGS. 12 and 13.

Figure 12:
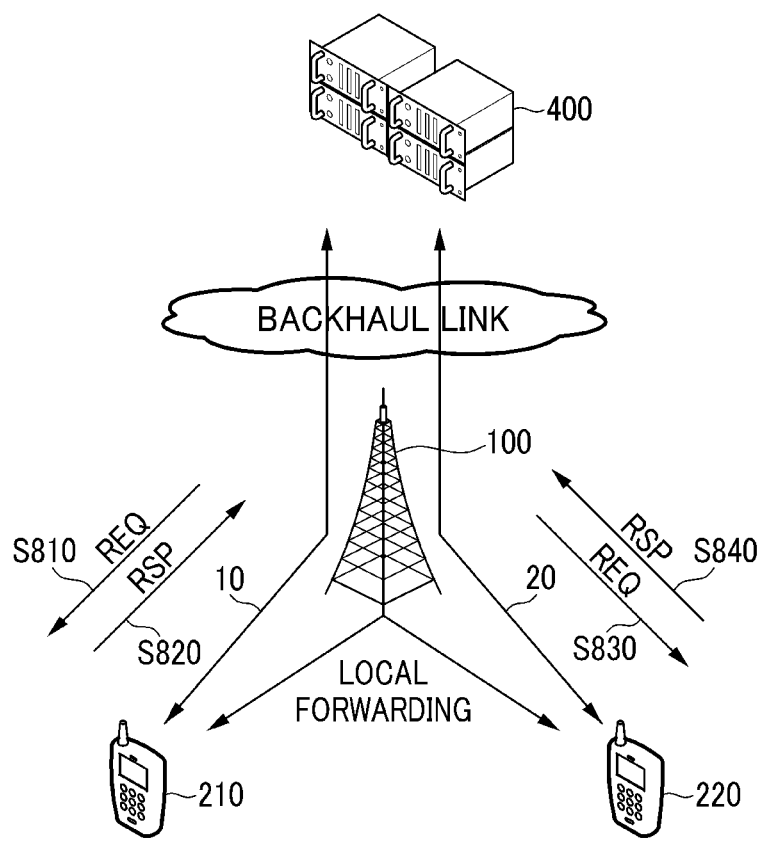
FIG. 12 is a view illustrating a method for terminating communication between terminals when a backbone network is damaged according to another exemplary embodiment of the present invention.
Figure 13:
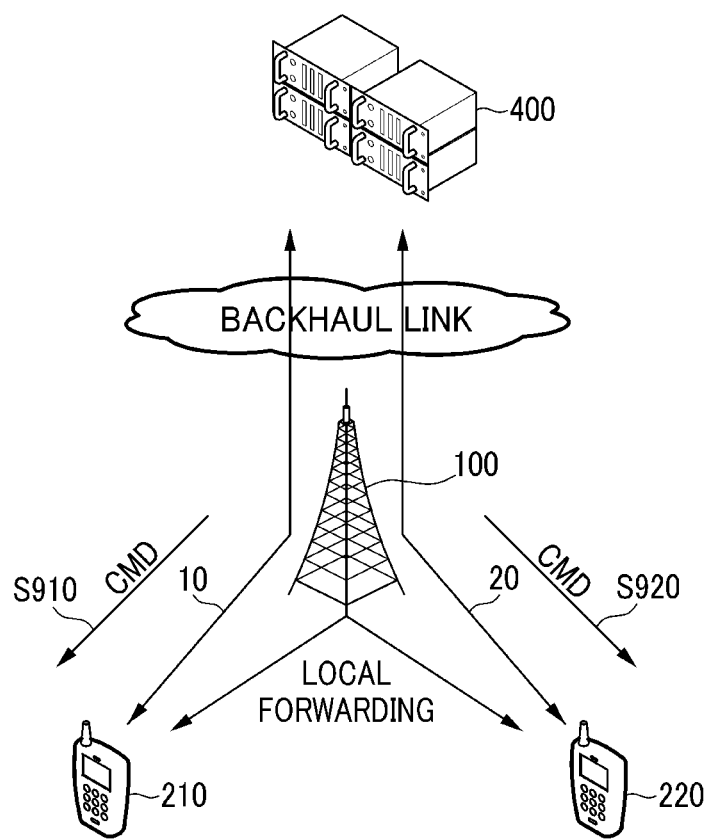
FIG. 13 is a view illustrating a method for terminating communication between terminals when a backbone network is damaged according to another exemplary embodiment of the present invention.

FIG. 12 and FIG. 13 are views illustrating a method for terminating communication between terminals when a backbone network is damaged according to another exemplary embodiment of the present invention.

The termination of the standalone network is performed when a collapsed or disconnected backbone network is properly restored. Referring to FIG. 12, the base station 100 detects restoration of the backbone network, and notifies the terminal 210 about the restoration of the backbone network through a request message (S810). Then, the terminal 210 transmits a response message to the base station 100 (S820). Also, the base station 100 notifies the terminal 220 about the restoration of the backbone network through a request message (S830). Then, the terminal 220 transmits a response message to the base station 100 (S840).

If communication between the terminal 210 and the terminal 220 can be continuously serviced without help from an upper layer network, the terminal 210 or the terminal 220 can inform the base station 100 of this fact through a request message. At this point, the base station 100 may continue to maintain local forwarding according to the capability of the base station 100, or may not support local forwarding upon termination of the standalone network.

Referring to FIG. 13, the procedure of FIG. 12 is omitted, and a broadcast message CMD is simply transmitted from the base station 100 to the terminals 210 and 220 (S910). By this, the terminals 210 and 220 are notified of the termination of the standalone network, and the standalone network is terminated. In this case, local forwarding may be continuously maintained without help from an upper layer network, or support for continuous forwarding may be provided with the help of the upper layer network.

Figure 14:
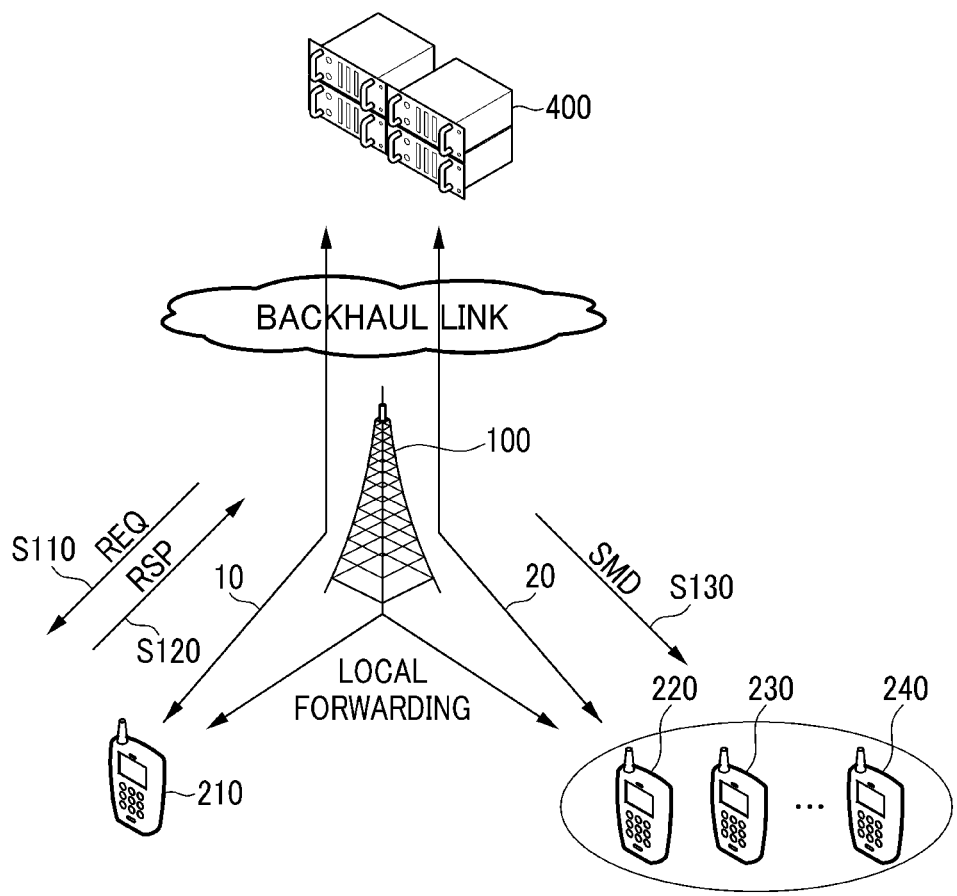
FIG. 14 is a view illustrating a method for terminating communication between terminals when a backbone network is damaged according to another exemplary embodiment of the present invention.

FIG. 14 is a view illustrating a method for terminating communication between terminals when a backbone network is damaged according to another exemplary embodiment of the present invention, in which the standalone network as shown in FIG. 11 is terminated.

When intending to terminate multicast communication within a standalone network, as shown in FIG. 11, the base station 100 and the terminal 210 exchange a request message and a response message each containing a multicast group identifier and flow identifier of a service they want to terminate (S110 and S120). By this, the service is terminated, and the base station 100 transmits, to the plurality of receiver terminals 220, 230, and 240, a command message containing the multicast group identifier and flow identifier of the service they want to terminate (S130). In the case that the terminal 210, which creates and receives a service, is capable of getting continuous service without help from an upper layer network, this fact can be included and transmitted in a response message, thereby enabling the base station 100 to maintain local forwarding.

When there is a need to modify or update a flow configured in the standalone network, the above-mentioned messages or similar ones may be used, which can be initiated by the base station 100 or the terminal 210.

As seen from above, according to the present invention, when the backbone network of the base station is damaged and disconnected from an upper layer network in a communication system, support is provided for communication between terminals within the base station, thus making it possible to perform smooth communication tasks.

While the exemplary embodiment of the present invention has been described with respect to an example in which the backbone network between the base station 100 communicating with the terminals 210 and 220 and the server 400 is collapsed, all exemplary embodiments of the present invention are applicable when a relay station (not shown), instead of the base station 100, is used.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for communication of a base station when backbone connectivity between the base station and a backbone network is lost, a first terminal and a second terminal being connected to the base station, the method comprising:

subsequent to loss of the backbone connectivity between the base station and the backbone network, setting up a local forwarding path without using the backbone network by receiving, from the first terminal, a first request message for communication with the second terminal;

transmitting, to the second terminal, a second request message for communication setup with the first terminal;

receiving a second response message from the second terminal; and transmitting a first response message to the first terminal, to thereby set up the local forwarding path via the base station between the first and second terminals; and forwarding data between the first and second terminals by local forwarding without going through the backbone network.

2. The method of claim 1, wherein the first response message contains information about the allocation of a service flow.

3. The method of claim 1, further comprising transmitting, to the first terminal, a command message containing information required for flow creation.

4. The method of claim 1, further comprising:

if the backbone network is restored, transmitting a third request message indicative of the restoration to the first terminal; and receiving a third response message from the first terminal.

5. The method of claim 1, further comprising:

transmitting a fourth request message indicative of the restoration to the second terminal; and receiving a fourth response message from the second terminal.

* * * * *